(12) United States Patent
Srinivas et al.

(10) Patent No.: US 8,270,357 B1
(45) Date of Patent: Sep. 18, 2012

(54) METHODS AND SYSTEMS FOR EV-DO FEMTOCELLS TO USE PROXIMITY TO PRIORITIZE SERVICE TO ACCESS TERMINALS

(75) Inventors: Shilpa Kowdley Srinivas, Herndon, VA (US); Bhagwan Khanka, Lenexa, KS (US); Anoop K. Goyal, Overland Park, KS (US); John W. Prock, Peculiar, MO (US)

(73) Assignee: Sprint Spectrum L.P., Overland Park, KS (US)

( * ) Notice: Subject to any disclaimer, the term of this patent is extended or adjusted under 35 U.S.C. 154(b) by 385 days.

(21) Appl. No.: 12/578,347

(22) Filed: Oct. 13, 2009

(51) Int. Cl.
*H04W 4/00* (2009.01)
*H04W 72/00* (2009.01)
*H04W 24/00* (2009.01)
*H04B 7/216* (2006.01)

(52) U.S. Cl. ........ 370/329; 370/230; 370/335; 370/342; 455/450; 455/456.4

(58) Field of Classification Search .................. 370/329, 370/335
See application file for complete search history.

(56) References Cited

U.S. PATENT DOCUMENTS

| | | | |
|---|---|---|---|
| 6,970,437 B2 | 11/2005 | Lott et al. | |
| 7,058,124 B2 | 6/2006 | Koo | |
| 7,069,037 B2 | 6/2006 | Lott et al. | |
| 7,647,065 B2 | 1/2010 | Au et al. | |
| 7,831,257 B2 | 11/2010 | Pollman et al. | |
| 7,936,698 B1 | 5/2011 | Sarkar et al. | |
| 7,991,422 B2 | 8/2011 | Oroskar et al. | |
| 2003/0218997 A1 | 11/2003 | Lohtia et al. | |
| 2004/0121808 A1* | 6/2004 | Hen et al. | 455/561 |
| 2004/0179494 A1 | 9/2004 | Attar et al. | |
| 2004/0179525 A1 | 9/2004 | Balasubramanian et al. | |
| 2004/0214591 A1 | 10/2004 | Lott et al. | |
| 2005/0047365 A1 | 3/2005 | Hong et al. | |
| 2006/0203724 A1 | 9/2006 | Ghosh et al. | |
| 2006/0223444 A1 | 10/2006 | Gross et al. | |
| 2006/0291383 A1 | 12/2006 | Bi et al. | |
| 2007/0168482 A1 | 7/2007 | Chen et al. | |
| 2007/0192090 A1 | 8/2007 | Shahidi | |
| 2007/0286128 A1 | 12/2007 | Bae et al. | |
| 2008/0004031 A1 | 1/2008 | Rong et al. | |
| 2008/0049706 A1 | 2/2008 | Khandekar et al. | |
| 2008/0062925 A1 | 3/2008 | Mate et al. | |
| 2008/0137614 A1 | 6/2008 | Kwon et al. | |
| 2008/0212460 A1 | 9/2008 | Sampath | |

(Continued)

OTHER PUBLICATIONS

Non-Final Office Action mailed Aug. 3, 2011 for U.S. Appl. No. 12/356,590.

(Continued)

*Primary Examiner* — Derrick Ferris
*Assistant Examiner* — Jasmine Myers

(57) ABSTRACT

Methods and systems are provided for EV-DO femtocells to use proximity to prioritize service to access terminals. In an embodiment, a femtocell assigns a first range of MAC IDs to a first group of access terminals, where the first group is those access terminals that are less than a threshold distance from the femtocell. The femtocell assigns a second range of MAC IDs to a second group of access terminals, where the second group is those access terminals that are more than the threshold distance from the femtocell. The femtocell repeatedly transmits (1) a first reverse activity bit (RAB) to the first group and (2) a second RAB to the second group, and measures reverse noise rise (RNR) on a femtocell carrier. If the measured RNR is greater than the threshold, the femtocell responsively (1) clears the first RAB and (2) sets the second RAB.

25 Claims, 4 Drawing Sheets

U.S. PATENT DOCUMENTS

| | | | |
|---|---|---|---|
| 2009/0054072 | A1 | 2/2009 | Chen et al. |
| 2009/0103507 | A1 | 4/2009 | Gu et al. |
| 2009/0170547 | A1* | 7/2009 | Raghothaman et al. ...... 455/522 |
| 2010/0002673 | A1 | 1/2010 | Bae et al. |
| 2010/0014487 | A1 | 1/2010 | Attar et al. |
| 2010/0103877 | A1 | 4/2010 | Wang et al. |
| 2010/0135213 | A1 | 6/2010 | Au et al. |
| 2010/0167777 | A1 | 7/2010 | Raghothaman et al. |
| 2010/0279653 | A1 | 11/2010 | Poltorak |

OTHER PUBLICATIONS

Non-Final Office Action mailed Aug. 17, 2011 for U.S. Appl. No. 12/404,846.

Unpublished U.S. Appl. No. 12/356,590, entitled "Method and System for Providing Multiple Reverse Activity Bits" filed Jan. 21, 2009 in the name of Hemanth Balaji Pawar.

Unpublished U.S. Appl. No. 12/620,344, entitled "Improving Reverse-Link Performance by Using Differentiated Reverse Activity Bits (RABs) Based on Mobile-Station Revision" filed Nov. 17, 2009 in the name of Jasinder P. Singh.

Unpublished U.S. Appl. No. 12/620,364, entitled "Using Mobile-Station Revision Ratio to Improve Reverse-Link Performance" filed Nov. 17, 2009 in the name of Jasinder P. Singh.

Unpublished U.S. Appl. No. 12/404,846, entitled "Method and System for Quality-of-Service-Differentiated Reverse Activity Bit" filed Mar. 16, 2009 in the name of Hemanth Balaji Pawar.

Non-Final Office Action mailed Mar. 2, 2012 for U.S. Appl. No. 12/356,590.

Notice of Allowance mailed Feb. 14, 2012 for U.S. Appl. No. 12/620,344.

* cited by examiner

METHODS AND SYSTEMS FOR EV-DO FEMTOCELLS TO USE PROXIMITY TO PRIORITIZE SERVICE TO ACCESS TERMINALS

BACKGROUND

1. Macro Cellular Wireless Networks

Many people use mobile stations, such as cell phones and personal digital assistants (PDAs), to communicate with macro cellular wireless networks (i.e. wireless wide area networks (WWANs)), which typically provide communication services such as voice, text messaging, and packet-data communication. These mobile stations and networks typically communicate with each other over a radio frequency (RF) air interface according to a wireless protocol. Mobile stations typically conduct wireless communications with these networks via one or more base transceiver stations (BTSs), each of which are arranged to send communications to and receive communications from mobile stations over the air interface.

Each BTS is in turn connected with a network entity known as a base station controller (BSC) (also known as a radio network controller (RNC)), which controls one or more BTSs and acts as a conduit between the one or more BTSs and one or more switches or gateways, such as a mobile switching center (MSC) and/or a packet data serving node (PDSN). The one or more switches or gateways may then interface with one or more signaling and/or transport networks. As examples, an MSC may interface with the public switched telephone network (PSTN), while a PDSN may interface with one or more core packet data networks and/or the Internet. As such, mobile stations can typically communicate over the one or more signaling and/or transport networks from anywhere inside the coverage area of one or more BTSs, via the BTS(s), a BSC or RNC, and a switch or gateway such as an MSC and/or PDSN.

The base stations (i.e. BTSs or combinations of one or more BTSs and a BSC (or RNC)) for these macro cellular networks are typically not associated with any subscriber or small group of subscribers in particular; rather, they are placed in publicly-accessible locations and are used by the service provider's customers generally. These base stations collectively blanket cities, rural areas, etc. with coverage; as such, they are referred to generally and herein as macro (or macro-network) base stations, and the network they collectively form—or to which they collectively belong—is referred to generally and herein as the macro network. And the BTSs associated with macro networks may be referred to herein as macro BTSs (or just BTSs).

Mobile stations and macro base stations conduct communication sessions (e.g. voice calls and data sessions) over frequencies known as carriers (i.e. macro carriers), each of which may actually be a pair of frequencies, with the base station transmitting to the mobile station on one of the frequencies, and the mobile station transmitting to the base station on the other. This approach is known as frequency division duplex (FDD). And the base-station-to-mobile-station link is known as the forward link, while the mobile-station-to-base-station link is known as the reverse link. Note that an instance of a carrier in a macro coverage area referred to as a sector may be known and referred to herein as a sector-carrier or macro sector-carrier.

2. Femtocells

Many macro-network subscribers, including private consumers and small businesses, in addition to having wireless service (which may include data service) for their respective mobile stations, also have high-speed (a.k.a. broadband) Internet access through another communication channel, which may be cable-modem service, digital-subscriber-line (DSL) service, satellite-based Internet service, and/or some other option or combination thereof.

In one arrangement, a user may have a cable modem connected (a) via coaxial cable to a cable provider's network and (b) via Ethernet cable to a wireless (e.g. IEEE 802.11 (WiFi)) router. That router may include one or more Ethernet ports to which computers or other devices may be connected, and may also include wireless-access-point functionality, providing a wireless packet-data interface to, e.g., laptop computers, digital video recorders (DVRs), appliances, and/or any other computing devices or their respective wireless network adapters.

To address gaps in macro-network coverage (e.g. in buildings) and for other reasons, macro-network service providers offer consumers devices referred to herein as femtocells, which may also be referred to as femto base stations, femto BTSs, picocells, pico base stations, pico BTSs, microcells, micro base stations, micro BTSs, and by other names, such as Internet base stations or perhaps low-cost Internet base stations (LCIBs). Note that the aforementioned terms that end in "cell" may also be used generally and herein to refer to the coverage area provided by the device. And with respect to the term LCIB, low-cost is not used as a limiting term; that is, devices of any monetary cost may be categorized as LCIBs, though most LCIBs typically will be less expensive on average than most macro-network base stations.

A femtocell may be approximately the size of a desktop phone or WiFi access point, and is essentially a low-power, low-capacity version of a macro base station. Thus, a femtocell may use a power outlet, perhaps with a transformer providing a DC power supply. The femtocell may have a wired (e.g. Ethernet) or wireless (e.g. WiFi) connection with the user's router, and would thus have connectivity to the Internet and/or one or more other packet-data networks via that broadband connection. A femtocell may establish a virtual-private-network (VPN) connection over the Internet with an entity (e.g. a VPN terminator) on the wireless-service (macro-network) provider's core network, and thereby be able to securely communicate via the VPN terminator with other entities on that core network and beyond.

A typical femtocell also has a wireless-communication interface (operating according to, e.g., CDMA (Code Division Multiple Access), EV-DO (Evolution Data Optimized), and/or one or more other protocols) that is compatible with the user's mobile station(s), such that the femtocell may act as a micro base station, providing coverage for the mobile station(s) on the macro-network provider's network via the user's Internet connection. Usually, a femtocell provides service on a single RF carrier (or on a single carrier per protocol, if multiple protocols (e.g. CDMA and EV-DO) are supported), and transmits what is known as and referred to herein as a pilot beacon, which is a radio beacon that includes administrative messages and parameters that mobile stations use to connect with (i.e. handoff to) the femtocell.

A femtocell typically emits the pilot beacon on one or more macro carriers on which service is provided by the surrounding macro network. If service is provided by the surrounding macro network on only one macro carrier, the femtocell will emit its pilot beacon on that macro carrier. If, as is often the case, service is provided by the surrounding macro network on multiple macro carriers, the femtocell may sequentially step through emitting its pilot beacon on some number of those carriers; that is, the femtocell's pilot beacon may "hop"

on a fixed number of macro carriers, and in that scenario is referred to as a frequency-hopping pilot beacon.

And femtocells typically include a Global Positioning System (GPS) receiver for use in receiving and decoding GPS signals, for use in determination of location, as well as for use in synchronizing operations with other femtocells and/or the macro network, based on timing information embedded in GPS signals. Typically, femtocells have fairly comprehensive auto-configuration capabilities, such that they are largely "plug-and-play" to the user.

OVERVIEW

As referenced above, one wireless protocol that may be used in a given network—and by femtocells in that network—is known as EV-DO. Networks operating according to EV-DO may operate in compliance with one or both of IS-856, Release 0 and IS-856, Revision A, both of which are hereby incorporated herein by reference. In EV-DO networks, BSCs are typically referred to as RNCs, mobile stations are referred to as access terminals, and a combination of an RNC and one or more BTSs is referred to as an access node. These terms may be used in the balance of this written description, for illustration and not limitation.

EV-DO femtocells, like their macro-base-station counterparts, use a Reverse Activity Bit (RAB) to regulate reverse-link data rates, and thus reverse-link transmission-power levels, of access terminals. Femtocells periodically, and in fact quite frequently, measure what is known as reverse noise rise (RNR) on the carrier on which the femtocell provides service to access terminals (i.e. the "femtocell carrier"). The measurement of RNR is known in the art as a computation of how much the reverse noise on a carrier has risen above a baseline level (or noise floor) for that carrier, which may be determined using a coordinated silent interval (during which access terminals do not make reverse-link transmissions), or a lowest measurement of reverse noise in the previous 24 hours, or perhaps some other metric and/or approach.

In any event, each time the femtocell measures the RNR, it compares that measurement to an RNR threshold: if the measured RNR exceeds the RNR threshold, the femtocell sets the RAB (i.e. makes the RAB equal to 1); if, however, the measured RNR is less than the RNR threshold, the femtocell clears the RAB (i.e. makes the RAB equal to 0). In a conventional implementation, each time the femtocell decides to set or maintain the RAB at 1, or to set or maintain the RAB at 0, the femtocell then transmits the set (i.e. 1) or clear (i.e. 0) RAB via a forward-link administrative channel to all access terminals operating on the femtocell carrier.

Those access terminals then process the RAB upon receipt; and though this processing is different in IS-856, Rel. 0 and Rev. A, in both cases the RAB being set causes access terminals to maintain or decrease their reverse-link data rates (and thus maintain or decrease reverse-link transmission power), while the RAB being clear causes access terminals to maintain or increase their reverse-link data rates (and thus maintain or increase reverse-link transmission power).

Note as well that femtocells can typically operate in a restricted mode and an unrestricted mode. In restricted mode, only a particular set of access terminals can engage in communication sessions (i.e. voice and/or data calls) via the femtocell. In unrestricted mode, any compatible access terminals can do so. If a particular subscriber has subscribed to femtocell service with a wireless carrier, and acquired and installed a femtocell in, for example, their home or office, the particular subscriber may decide to operate the femtocell in unrestricted mode (or this could be the default (i.e. the factory setting), or mandated by the service provider, etc.).

In that case, the femtocell may be able to be used for conducting communication sessions by both (1) the subscriber's one or more access terminals (e.g. the subscriber's access terminal and those of one or more family members, employees, etc. (i.e. the intended users or intended access terminals)) and (2) one or more other access terminals that may constantly or temporarily be nearby (i.e. the unintended users or unintended access terminals). This situation may trigger the femtocell to set the RAB, holding down the reverse-link data rates, and thus the reverse-link throughput, of the intended access terminals and unintended access terminals alike. Clearly this is undesirable for the subscriber that has subscribed to—and paid for—femtocell service.

The present methods and systems stem at least in part from recognizing that the intended access terminals will almost always be physically closer than the unintended access terminals to the location of the femtocell. This relative relationship is even more likely to hold true in the case of femtocells that use directional antennas and are located in the corner of a home or office, reducing the extent of coverage offered through walls to nearby homes, offices, sidewalks, etc.

One additional EV-DO construct that is relevant to the present methods and systems is known as the MAC ID, which is an identifier that a femtocell or macro base station assigns to each access terminal that registers with the femtocell or macro base station. In the case of either a femtocell or macro base station, but speaking with respect to a femtocell, the femtocell would then use the MAC ID that is assigned to a particular access terminal to address forward-link data to that access terminal. In a typical implementation, a femtocell may be able to assign MAC IDs to access terminals in a range from 0 to 127, inclusive, though other possibilities abound.

In accordance with the present methods and systems, a femtocell may correlate different ranges of MAC IDs with different distance zones with respect to the femtocell's location. And it should be noted that, while any number of range-zone combinations may be used, for clarity of presentation, an example embodiment is described using two ranges of MAC IDs respectively associated with two distance zones (i.e. near and far).

In an embodiment, a femtocell assigns MAC IDs 72 through 127 to access terminals that are considered to be near (i.e. less than a threshold distance from) the femtocell, and assigns MAC IDs 6 to 63 to access terminals that are considered to be far (i.e. more than the threshold distance) from the femtocell. And numerous variations are possible, such as using more than two groupings of MAC IDs as noted above, reserving some MAC IDs for special purposes, etc. The threshold distance may be configurable by the user, manufacturer, and/or service provider, etc. MAC IDs that are designated for access terminals that are within the threshold distance may be referred to herein as near_MAC_IDs, while MAC IDs that are designated for access terminals that are beyond the threshold distance may be referred to herein as far_MAC_IDs.

The femtocell, perhaps in cooperation with an access terminal that is requesting service from the femtocell, may determine in any suitable way whether the access terminal is within or beyond the threshold distance. As one example, the femtocell could maintain data reflecting the femtocell's own location, and then query the access terminal for the access terminal's location (or receive the access terminal's location unsolicited from the access terminal), and then compute the difference between the two locations. Other possibilities include inferring the distance based on an elapsed time for data to travel between the femtocell and the access terminal, based on the signal strength of one as measured by the other, and/or using one or more other approaches for determining or approximating the distance between the femtocell and the access terminal.

When the femtocell determines that the measured RNR exceeds the RNR threshold, the femtocell sets the RAB for (i.e. transmits a RAB equal to 1 to) any access terminals that have been assigned a far_MAC_ID, while clearing the RAB for (i.e. transmitting a RAB equal to 0 to) any access terminals that have been assigned a near_MAC_ID. Selective transmission of different RABs to different access terminals based on MAC IDs respectively assigned to those access terminals is described in U.S. patent application Ser. No. 12/356,590, entitled "Method and System for Providing Multiple Reverse Activity Bits," filed Jan. 21, 2009, which is hereby incorporated herein by reference. As described in that application, the femtocell may use two different MAC sub-channels (such as 0 and 1, which have no predefined assignment in EV-DO, and thus would not be assigned to particular access terminals) on the forward link to provide one RAB to near access terminals and another RAB to far access terminals.

In an embodiment, if the above-described selective setting of the RAB for far access terminals and clearing of the RAB for near access terminals is not sufficient to provide a certain level of service (e.g. throughput) to the near access terminals, the femtocell may force the far access terminals into a dormant state (i.e. forcing those far access terminals to surrender any of the femtocell's radio resources that they are currently using). The femtocell may do this by sending a command to the far access terminals to go dormant.

In an embodiment, when the femtocell determines that RNR has fallen below the RNR threshold referenced above (or some other RNR threshold), the femtocell may send a command to any access terminals that the femtocell previously instructed to go dormant, instructing those access terminals that they can return to an active state. The femtocell may, also or instead, clear the RAB for the far access terminals upon determining that the RNR has fallen below the RNR threshold referenced above (or some other RNR threshold).

As stated, the presently disclosed methods and systems may be implemented using more than two categories of MAC IDs, and thus more than two categories of associated distances from the femtocell. In an embodiment involving more than two such groupings, the femtocell may iteratively set the RAB for the furthest-out group, check whether sufficient performance metrics (e.g. throughput) are achieved by the nearest group, and then if necessary set the RAB for the second-furthest-out group, check the metrics again, etc. And certainly other possibilities exist.

In an embodiment, the femtocell may consider one or more conditions in addition to RNR when deciding whether to (1) set the RAB for far access terminals and (2) clear the RAB for near access terminals. In an embodiment, one such condition may be whether one or more far access terminals—or perhaps all far access terminals—are requesting a data rate (using the Data Rate Control (DRC) channel) that is below a data-rate threshold. In an embodiment, one such condition may be whether one or more far access terminals—or perhaps all far access terminals—are reporting a signal-to-noise ratio (SINR) (with respect to the signal received from the femtocell) that is below a SINR threshold. As stated, either or both of these conditions could be considered by the femtocell—in addition to RNR—as necessary to (1) set the RAB for far access terminals and (2) clear the RAB for near access terminals.

Thus, among other advantages and benefits, the present methods and systems reduce the probability that intended (i.e. near) access terminals will experience degradation in reverse-link performance (e.g., worse throughput, longer setup time, more latency, etc.) due to unintended (i.e. far) access terminals generating excessive reverse noise on the femtocell carrier.

And it should be noted that the above overview is illustrative and not limiting. That is, additional and/or different features may be present in some embodiments. It should be noted as well that any description of an access terminal, a femtocell, and/or a macro network operating according to any particular protocol such as EV-DO is by way of example, and that any suitable protocol(s) may be used instead, such as 1xRTT CDMA, iDEN, TDMA, AMPS, GSM, GPRS, UMTS, EDGE, WiMax (e.g. IEEE 802.16), LTE, microwave, satellite, MMDS, Wi-Fi (e.g. IEEE 802.11), Bluetooth, infrared, and/or any other now known or later developed.

BRIEF DESCRIPTION OF THE DRAWINGS

Various exemplary embodiments are described herein with reference to the following drawings, wherein like numerals denote like entities.

DETAILED DESCRIPTION OF EXEMPLARY EMBODIMENTS

1. Exemplary Architecture a. An Exemplary Communication System

Figure 1:
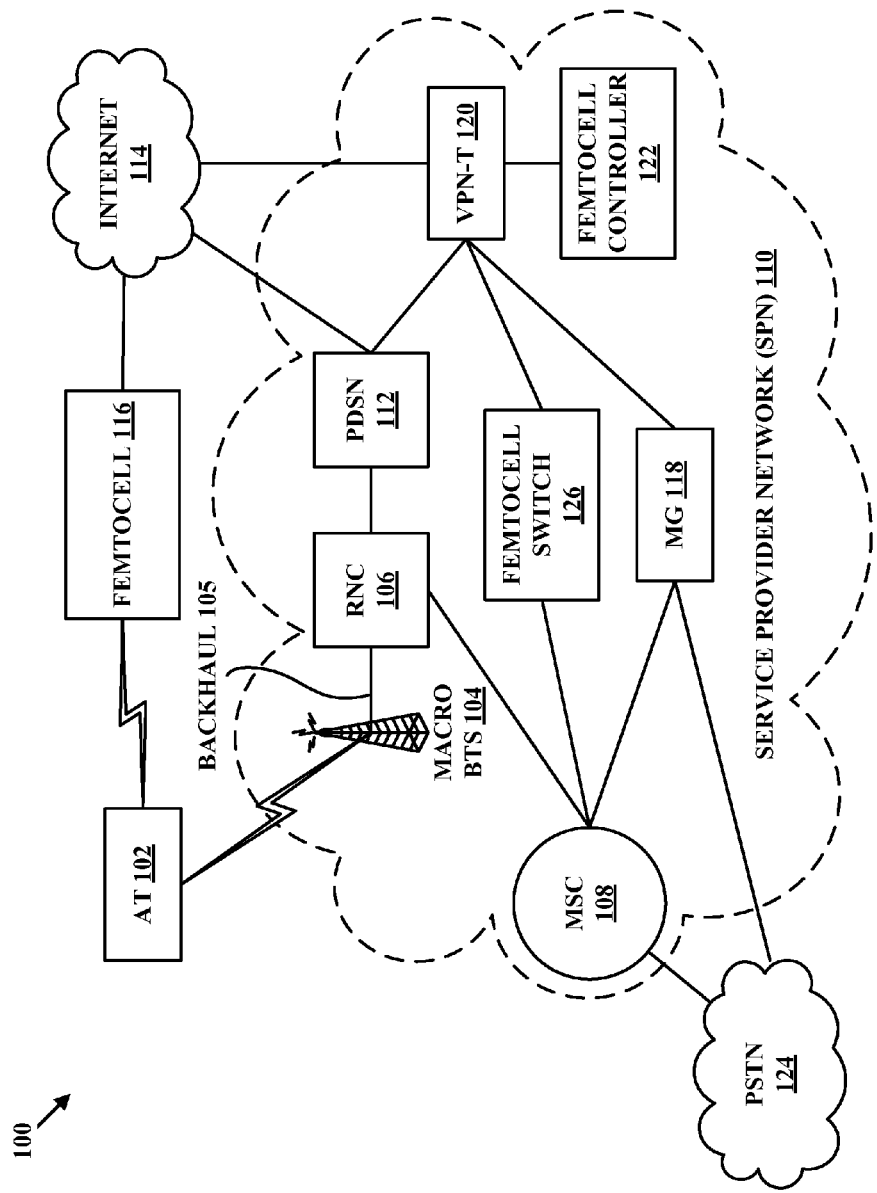
FIG. 1 depicts a communication system, in accordance with exemplary embodiments.

FIG. 1 is a simplified block diagram of a communication system, in accordance with exemplary embodiments. It should be understood that this and other arrangements described herein are set forth only as examples. Those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. Various functions may be carried out by a processor executing instructions stored in memory.

As shown in FIG. 1, a communication system 100 includes an access terminal (AT) 102, a macro BTS 104, an RNC 106, an MSC 108, a service provider network (SPN) 110, a PDSN 112, an Internet 114, a femtocell 116, a media gateway 118, a VPN terminator (VPN-T) 120, a femtocell controller 122, a PSTN 124, and a femtocell switch 126. And additional entities could be present as well, such as additional access terminals in communication with macro BTS 104, additional entities in communication with Internet 114 and/or PSTN 124, etc. Also, there could be one or more devices and/or networks making up at least part of one or more communication links. For example, there could be one or more routers, cable modems, and/or other devices or networks on the link between Internet 114 and femtocell 116.

Access terminal 102 may be any mobile device arranged to carry out the access-terminal functions described herein. Access terminal 102 may include a user interface, a wireless-communication interface, a processor, and data storage comprising instructions executable by the processor for carrying out those access-terminal functions. The user interface may include buttons, a touchscreen, a microphone, and/or any other elements for receiving inputs, as well as a speaker, one or more displays, and/or any other elements for communicating outputs.

The wireless-communication interface may include an antenna and a chipset suitable for communicating with one or more macro base stations and/or one or more femtocells over suitable air interfaces. The chipset could be suitable for EV-DO communication. The chipset or wireless-communication interface in general may also be able to communicate with other types of networks and devices, such as 1xRTT CDMA networks, Wi-Fi networks, Bluetooth devices, and/or one or more additional types of networks and devices. The processor and data storage may be any suitable components known to those of skill in the art. As examples, access terminal 102 could be or include a cell phone, a PDA, a computer, a laptop computer, a hybrid CDMA/EV-DO device, and/or a multi-mode cellular/Wi-Fi device.

Macro BTS 104 may be any network element arranged to carry out the macro-BTS functions described herein. As such, macro BTS 104 may include a communication interface, a processor, and data storage comprising instructions executable by the processor to carry out those macro-BTS functions. The communication interface may include one or more antennas, chipsets, and/or other components for providing one or more (e.g. EV-DO) coverage areas such as cells and sectors, for communicating with access terminals such as access terminal 102 over an air interface. The communication interface may also include one or more wired (e.g. Ethernet) and/or wireless (e.g. WiFi) interfaces for communicating with at least RNC 106.

RNC 106 may be any network element arranged to carry out the RNC functions described herein, and may include a communication interface, a processor, and data storage comprising instructions executable by the processor to carry out those RNC functions. The communication interface may include one or more wired and/or wireless interfaces for communicating with at least macro BTS 104, MSC 108, and PDSN 112. In general, RNC 106 functions to control one or more macro BTSs such as macro BTS 104, and to provide those one or more macro BTSs with connections to devices such as MSC 108 and PDSN 112.

Note that the combination of macro BTS 104 and RNC 106 may be considered a macro base station. However, macro BTS 104 or RNC 106 could, taken alone, be considered a macro base station as well. Furthermore, a macro base station may be considered to be either or both of those devices, and perhaps make use of one or more functions provided by MSC 108, PDSN 112, and/or any other entity, without departing from the invention.

MSC 108 may be any networking element arranged to carry out the MSC functions described herein, and may include a communication interface, a processor, and data storage comprising instructions executable by the processor to carry out those MSC functions. The communication interface may include one or more wired and/or wireless interfaces for communicating with at least RNC 106, media gateway 118, femtocell switch 126, and PSTN 124. In general, MSC 108 acts as a switch between (a) PSTN 124 and (b)(i) one or more RNCs such as RNC 106 and (ii) one or more femtocell switches such as femtocell switch 126, facilitating communication between access terminals and PSTN 124, which may be the public switched telephone network.

Service-provider network 110 may encompass all of the network elements depicted in FIG. 1 as being included in its dashed-cloud shape. In general, there may be more and/or different communication links among entities within service-provider network 110, and there may be more and/or different connections between service-provider network 110 and outside entities. Furthermore, there may be a core packet network (not depicted) making up part of service-provider network 110, which may enable devices therein to communicate with each other. There may also be one or more other packet-data networks and/or elements, one or more circuit-switched networks and/or elements, one or more signaling networks and/or elements, and/or one or more of any other suitable network(s) and/or element(s).

PDSN 112 may be any networking element arranged to carry out the PDSN functions described herein, and may include a communication interface, a processor, and data storage comprising instructions executable by the processor for carrying out those PDSN functions. The communication interface may include one or more wired and/or wireless interfaces for communicating with at least RNC 106, VPN terminator 120, and Internet 114. In general, PDSN 112 acts as a network access server between (a) Internet 114 and (b)(i) RNCs such as RNC 106 and (ii) VPN terminators such as VPN terminator 120, facilitating packet-data communication between access terminals and Internet 114, via macro base stations and femtocells.

Internet 114 may be the well-known global packet-data network generally referred to as the Internet. However, Internet 114 may also be or include one or more other packet-data networks, without departing from the scope and spirit of the present invention. As such, Internet 114 may include one or more wide area networks, one or more local area networks, one or more public networks, one or more private networks, one or more wired networks, one or more wireless networks, and/or one or more networks of any other type. Devices in communication with Internet 114 may exchange data using a packet-switched protocol such as the Internet Protocol (IP), and may be identified by an address such as an IP address.

Femtocell 116 may be any computing and communication device arranged to carry out the femtocell functions described herein, and may include a communication interface, a processor, and data storage comprising instructions executable by the processor for carrying out those femtocell functions. The communication interface may include (a) a wireless interface for communicating with one or more access terminals according to a protocol such as EV-DO (and/or one or more other protocols) and (b) an Ethernet or WiFi interface for communicating with a device such as a router and/or a cable modem. Femtocell 116 may also have a GPS receiver and/or other location module, and is also described in connection with FIG. 2.

Media gateway 118 may be any networking element arranged to carry out the media-gateway functions described herein, and may include a communication interface, a processor, and data storage comprising instructions executable by the processor for carrying out those media-gateway functions. The communication interface may include a circuit-switched interface and a packet-switched interface. In operation, media gateway 118 may (a) receive packet-based communications from entities on SPN 110, convert those to circuit-switched communications, and pass them to MSC 108 and/or PSTN 124 and (b) receive circuit-switched communications from MSC 108 and/or PSTN 124, convert those to packet-based communications, and pass them to entities on SPN 110.

VPN terminator 120 may be any networking element arranged to carry out the VPN-terminator functions described herein. Thus, VPN terminator 120 may include a communication interface, a processor, and data storage comprising instructions executable by the processor for carrying out those VPN-terminator functions. The communication interface may include one or more wired and/or wireless interfaces for communicating with at least Internet 114, media gateway 118, femtocell controller 122, and femtocell switch 126. In general, VPN terminator 120 functions to establish secure VPN connections over Internet 114 with femtocells, enabling the femtocells to securely communicate with devices on SPN 110 and perhaps beyond.

Femtocell controller 122 may be any networking element arranged to carry out the femtocell-controller functions described herein, and may include a communication interface, a processor, and data storage comprising instructions executable by the processor for carrying out those femtocell-controller functions. The communication interface may include one or more wired and/or wireless interfaces for communicating with at least VPN terminator 120, along with perhaps one or more other entities on SPN 110, and beyond.

Among other functions, femtocell controller 122 communicates via VPN terminator 120 with femtocells such as femtocell 116, and may receive requests from various femtocells for configuration data, and those requests may include, among other values, indications of the femtocells' respective locations. Femtocell controller 122 may also be operable to select various operational parameters for femtocells (e.g. carrier, PN offset, whether to broadcast a pilot-beacon, contents of any pilot beacons to be broadcast, transmission-power level), and to transmit those parameters to femtocells, perhaps along with other configuration data and messaging.

Femtocell switch 126 may be any networking element arranged to carry out the femtocell-switch functions described herein, and may include a communication interface, a processor, and data storage comprising instructions executable by the processor for carrying out those femtocell-switch functions. The communication interface may include one or more wired and/or wireless interfaces for communicating with at least MSC 108 and VPN terminator 120. In general, femtocell switch 126 acts as a switch between MSC 108 and VPN terminator 120, enabling access terminals to communicate via femtocells over PSTN 124 via MSC 108.

b. An Exemplary Femtocell

Figure 2:
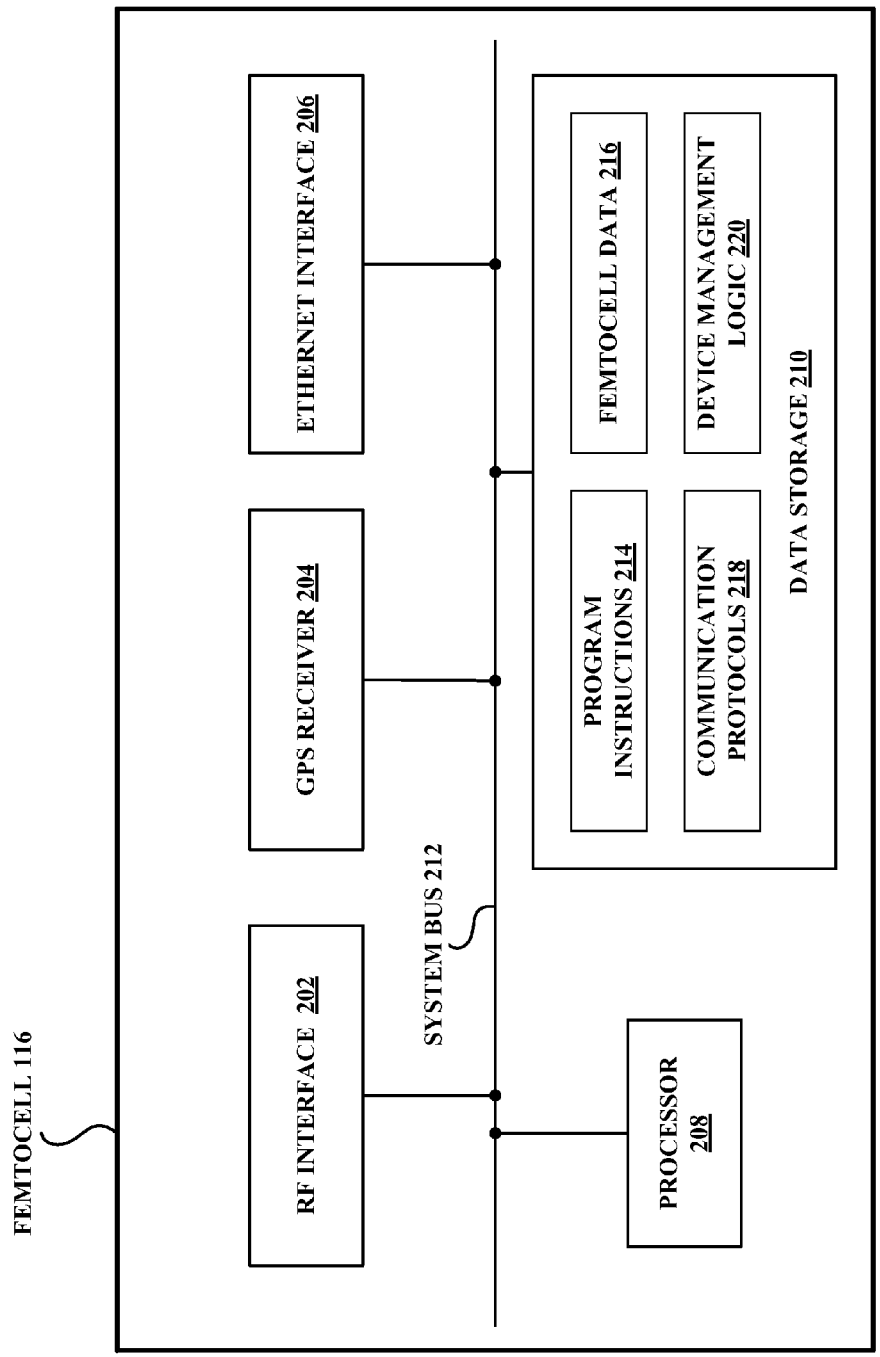
FIG. 2 depicts a femtocell, in accordance with exemplary embodiments.

FIG. 2 depicts an exemplary diagram of femtocell 116, which includes an RF interface 202, a GPS receiver 204, an Ethernet interface 206, a processor 208, and data storage 210, all communicatively linked by a system bus 212. Note that femtocell 116 could have additional and/or different components, and that this structure is provided by way of example.

RF interface 202 may include one or more antennas, one or more chipsets, a set of one or more channel elements, and/or one or more other components suitable for providing a wireless coverage area according to a wireless-communication protocol such as EV-DO (and/or one or more other protocols). GPS receiver 204 may be any known or hereafter-developed GPS receiver, suitable for receiving and decoding GPS signals for location and timing purposes, perhaps among other purposes. In some embodiments, a femtocell may have a location module in addition to or instead of a GPS receiver.

Ethernet interface 206 may provide a wired packet-data interface for communicating with a device such as a router or cable modem. Processor 208 may comprise multiple (e.g., parallel) processors, such as a general purpose microprocessor and/or a discrete digital signal processor. The data storage 210 may take various forms, in one or more parts, such as a non-volatile storage block and/or a removable medium, and may contain (a) program instructions 214 executable by processor 208 for carrying out the femtocell functions described herein, (b) femtocell data 216, which may be any operational or other data stored for use by femtocell 116, (c) communication protocols 218, facilitating and enabling communication with one or more other devices, and (d) device management logic 220, perhaps for memory and file management.

2. Exemplary Operation a. A First Exemplary Method

Figure 3:
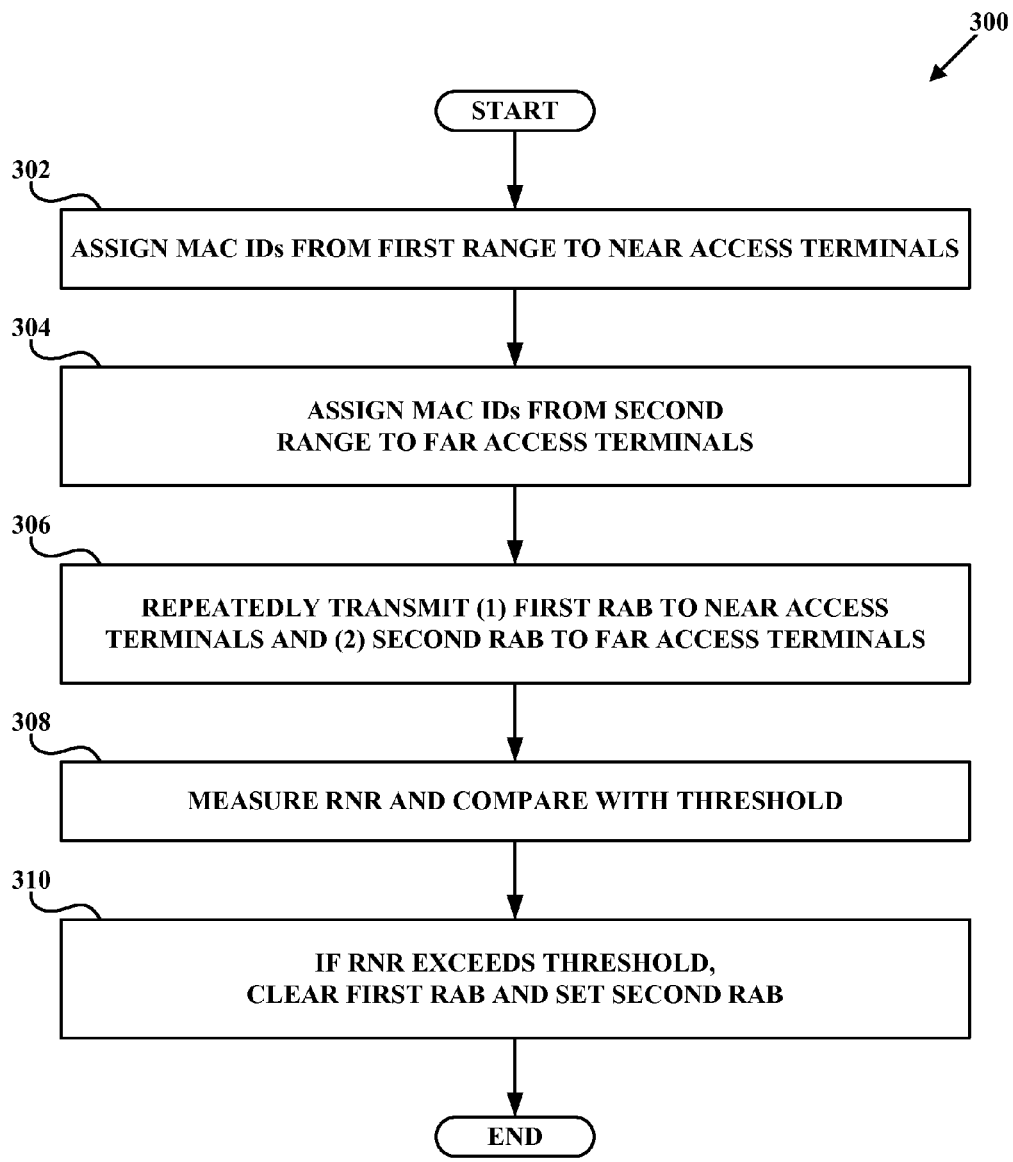
FIG. 3 depicts a method, in accordance with exemplary embodiments.

FIG. 3 depicts a method 300, which may be carried out by a femtocell such as femtocell 116, or may be carried out by femtocell 116 in cooperation with one or more other entities. Furthermore, femtocell 116 may provide EV-DO service to access terminals, where the service is in compliance with at least one of IS-856, Release 0 and IS-856, Revision A.

As shown in FIG. 3, method 300 begins at step 302, when femtocell 116 assigns MAC IDs in a first range of MAC IDs to a first group of access terminals, where the access terminals in the first group are those that are less than a threshold distance from femtocell 116. At step 304, femtocell 116 assigns MAC IDs in a second range of MAC IDs to a second group of access terminals, where the access terminals in the second group are those that are more than the threshold distance from femtocell 116, where the first and second ranges are mutually exclusive.

The first range of MAC IDs may consist of MAC IDs 72 through 127, while the second range of MAC IDs may consist of MAC IDs 6 through 63, though certainly other possibilities abound. In various embodiments, the threshold distance may be configurable by a user of femtocell 116, a manufacturer of femtocell 116, and/or a service provider. In an embodiment, method 300 may further comprise femtocell 116 determining whether a given access terminal is less than or rather more than the threshold distance from femtocell 116. Femtocell 116 may do this by computing a distance between a location of the access terminal and a location of femtocell 116, where femtocell 116 may receive the location of the access terminal from the access terminal, perhaps in response to a query from femtocell 116.

In another embodiment, femtocell 116 may determine whether the access terminal is less than or rather more than the threshold distance from femtocell 116 by computing a distance between femtocell 116 and the access terminal based on at least one of an elapsed time for data to travel between femtocell 116 and the access terminal, a signal strength of femtocell 116 as measured by the access terminal, and a signal strength of the access terminal as measured by femtocell 116. And certainly many other possibilities exist as well.

In an embodiment, femtocell 116 may assign the MAC IDs to the access terminals at the time the access terminals first request service from femtocell 116. In an embodiment, femtocell 116 may dynamically reassign MAC IDs from the first and second ranges to access terminals upon detecting changes in the distance from femtocell 116 of the respective access terminals. And a combination of these approaches is contemplated as well.

At step 306, femtocell 116 repeatedly transmits (1) a first RAB to the access terminals in the first group and (2) a second RAB to the access terminals in the second group. As described above, in an embodiment, a RAB being set causes an access terminal receiving that RAB to either maintain or decrease a reverse-link data rate for the access terminal, while a RAB being clear causes an access terminal receiving that RAB to either maintain or increase the reverse-link data rate for the access terminal. Other implementations may of course be used.

In an embodiment, femtocell 116 uses a first MAC sub-channel (e.g. MAC sub-channel 0) to transmit the first RAB, and a second MAC sub-channel (e.g. MAC sub-channel 1) to transmit the second RAB, the first MAC sub-channel being different from the second.

At step 308, femtocell 116 measures RNR on a femtocell carrier, which may be the carrier on which femtocell 116 provides wireless service to access terminals, and compares the measured RNR with a first RNR threshold.

At step 310, femtocell 116 determines that the measured RNR is greater than the first RNR threshold, and responsively (1) clears the first RAB and (2) sets the second RAB. This will cause the access terminals in the first group (i.e. the near access terminals) to maintain and/or increase their reverse-link data rates, while also causing the access terminals in the second group (i.e. the far access terminals) to maintain and/or decrease their reverse-link data rates, which collectively should provide a more favorable RF environment for the near access terminals, as compared with the RF environment that prevailed prior to the carrying out of step 310.

In an embodiment, femtocell 116 may thereafter determine that the measured RNR is less than a second RNR threshold, and responsively clear the second RAB. The second RNR threshold may be either equal to or not equal to the first RNR threshold. In one embodiment, the second RNR threshold is lower than the first RNR threshold.

In an embodiment, femtocell 116 may determine that, after (1) clearing the first RAB and (2) setting the second RAB, that at least one service metric (e.g. throughput) is below an associated threshold for at least one access terminal in the first group, and responsively instruct at least one access terminal in the second group to switch from an active state to a dormant state. In an embodiment, femtocell 116 may instruct every access terminal in the second group to switch from the active state to the dormant state. Note that femtocell 116 may thereafter determine that the measured RNR is less than a second RNR threshold, and responsively instruct the at least one access terminal in the second group to switch back to the active state. The second RNR threshold may be either equal to or not equal to the first RNR threshold. In one embodiment, the second RNR threshold is lower than the first RNR threshold.

In an embodiment, carrying out the steps of (1) clearing the first RAB and (2) setting the second RAB by femtocell 116 is further conditioned on whether at least one access terminal in the second group is currently (1) requesting a data rate that is below a data-rate threshold and/or (2) reporting a signal-to-noise ratio (SINR), with respect to the signal received from femtocell 116, that is below a SINR threshold. And other possibilities exist for additional conditions.

b. A Second Exemplary Method

Figure 4:
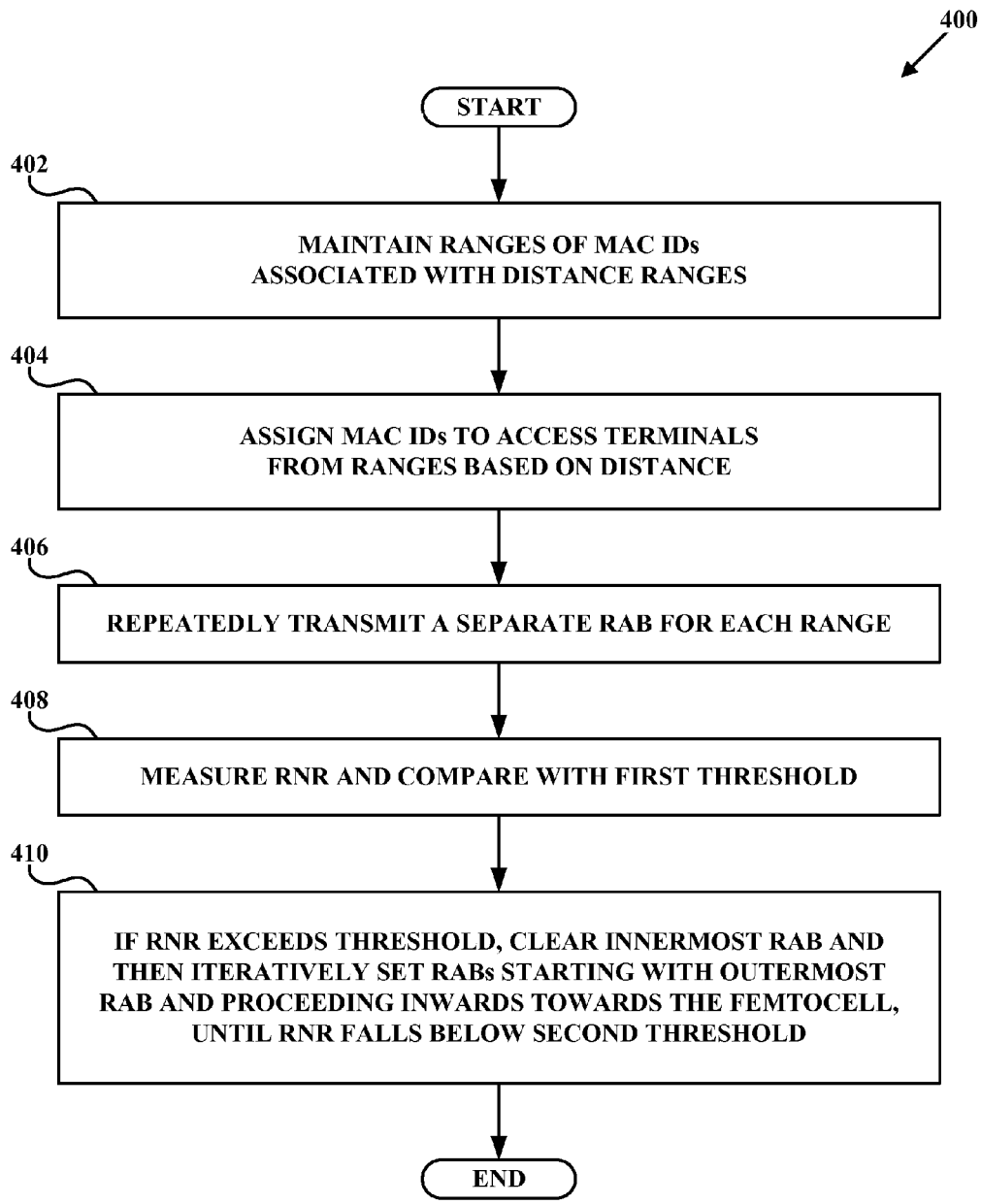
FIG. 4 depicts a method, in accordance with exemplary embodiments.

FIG. 4 depicts a method 400, which may be carried out by a femtocell such as femtocell 116, or may be carried out by femtocell 116 in cooperation with one or more other entities. Note that method 400 is similar in many ways to method 300, and thus will not be described in as great of detail. It is explicitly contemplated, however, that all possibilities and permutations that are described with respect to one of method 300 and 400 apply equally to the other.

As shown in FIG. 4, method 400 begins at step 402, when femtocell 116 maintains (1) a plurality of mutually exclusive ranges of MAC IDs and (2) a plurality of mutually exclusive ranges of distance from femtocell 116, wherein each range of MAC IDs is associated with a respective range of distance from the femtocell. Note that any number of ranges of MAC IDs and associated ranges of distance from femtocell 116 could be used in a given implementation.

At step 404, femtocell 116 assigns MAC IDs to access terminals, wherein femtocell 116 selects MAC IDs for assignment to access terminals from the ranges of MAC IDs according to the respective distance of the access terminals from the femtocell. At step 406, femtocell 116 repeatedly transmits a RAB for each respective range of MAC IDs.

At step 408, femtocell 116 measures RNR on a femtocell carrier, and compares the measured RNR with an RNR threshold. At step 410, femtocell 116 determines that the measured RNR is greater than the RNR threshold, and responsively (1) clears the RAB for the range of MAC IDs for an innermost range of distance from femtocell 116 and (2) iteratively sets the RABs starting with the RAB for the range of MAC IDs for an outermost range of distance from femtocell 116 and proceeding inwards towards femtocell 116, in each iteration checking the measured RNR against the RNR threshold, until the measured RNR is less than the threshold.

3. Conclusion

Various exemplary embodiments have been described above. Those skilled in the art will understand, however, that changes and modifications may be made to those examples without departing from the scope of the claims.

The invention claimed is:

1. A method comprising:
a femtocell assigning MAC IDs in a first range of MAC IDs to a first group of access terminals, wherein the access terminals in the first group are those that are less than a threshold distance from the femtocell;
the femtocell assigning MAC IDs in a second range of MAC IDs to a second group of access terminals, wherein the access terminals in the second group are those that are more than the threshold distance from the femtocell, the first and second ranges being mutually exclusive;
the femtocell repeatedly transmitting (1) a first reverse activity bit (RAB) to the access terminals in the first group and (2) a second RAB to the access terminals in the second group;
the femtocell measuring reverse noise rise (RNR) on a femtocell carrier, and comparing the measured RNR with a first RNR threshold; and
the femtocell determining that the measured RNR is greater than the first RNR threshold, and responsively (1) clearing the first RAB and (2) setting the second RAB.

2. The method of claim 1, wherein femtocell provides EV-DO service in compliance with at least one of IS-856, Release 0 and IS-856, Revision A.

3. The method of claim 1, wherein the first range of MAC IDs consists of MAC IDs 72 through 127, and wherein the second range of MAC IDs consists of MAC IDs 6 through 63.

4. The method of claim 1, wherein the threshold distance is configurable by at least one of a user of the femtocell, a manufacturer of the femtocell, and a service provider.

5. The method of claim 1, further comprising the femtocell determining whether an access terminal is less than or more than the threshold distance from the femtocell.

6. The method of claim 5, wherein the femtocell determines whether the access terminal is less than or more than the threshold distance from the femtocell by computing a distance between a location of the access terminal and a location of the femtocell.

7. The method of claim 6, wherein the femtocell receives the location of the access terminal from the access terminal.

8. The method of claim 5, wherein the femtocell determines whether the access terminal is less than or more than the threshold distance from the femtocell by computing a distance between the femtocell and the access terminal based on at least one of an elapsed time for data to travel between the femtocell and the access terminal, a signal strength of the femtocell as measured by the access terminal, and a signal strength of the access terminal as measured by the femtocell.

9. The method of claim 1, wherein a RAB being set causes an access terminal receiving that RAB to either maintain or decrease a reverse-link data rate for the access terminal, and wherein a RAB being clear causes an access terminal receiving that RAB to either maintain or increase the reverse-link data rate for the access terminal.

10. The method of claim 1, wherein the femtocell assigns the MAC IDs to the access terminals at the time that the access terminals first request service from the femtocell.

11. The method of claim 1, wherein the femtocell dynamically reassigns MAC IDs from the first and second ranges to access terminals upon detecting changes in the distance from the femtocell of the respective access terminals.

12. The method of claim 1, wherein the femtocell uses a first MAC sub-channel to transmit the first RAB, wherein the femtocell uses a second MAC sub-channel to transmit the second RAB, the first MAC sub-channel being different from the second MAC sub-channel.

13. The method of claim 12, wherein the first MAC sub-channel is sub-channel 0, and wherein the second MAC sub-channel is sub-channel 1.

14. The method of claim 1, further comprising the femtocell determining, after (1) clearing the first RAB and (2) setting the second RAB, that at least one service metric is below an associated service-metric threshold for at least one access terminal in the first group, and responsively instructing at least one access terminal in the second group to switch from an active state to a dormant state.

15. The method of claim 14, wherein the at least one service metric comprises throughput.

16. The method of claim 14, wherein instructing at least one access terminal in the second group to switch from the active state to the dormant state comprises instructing every access terminal in the second group to switch from the active state to the dormant state.

17. The method of claim 14, further comprising the femtocell determining that the measured RNR is less than a second RNR threshold, and responsively instructing the at least one access terminal in the second group to switch back to the active state.

18. The method of claim 14, wherein the first RNR threshold is equal to the second RNR threshold.

19. The method of claim 14, wherein the first RNR threshold is not equal to the second RNR threshold.

20. The method of claim 1, further comprising the femtocell determining that the measured RNR is less than a second RNR threshold, and responsively clearing the second RAB.

21. The method of claim 20, wherein the first RNR threshold is equal to the second RNR threshold.

22. The method of claim 20, wherein the first RNR threshold is not equal to the second RNR threshold.

23. The method of claim 1, wherein carrying out the steps of (1) clearing the first RAB and (2) setting the second RAB is further conditioned on whether at least one access terminal in the second group is currently (1) requesting a data rate that is below a data-rate threshold and/or (2) reporting a signal-to-noise ratio (SINR), with respect to the signal received from the femtocell, that is below a SINR threshold.

24. A femtocell comprising:
a communication interface;
a processor; and
data storage comprising instructions executable by the processor for:
assigning MAC IDs in a first range of MAC IDs to a first group of access terminals, wherein the access terminals in the first group are those that are less than a threshold distance from the femtocell;
assigning MAC IDs in a second range of MAC IDs to a second group of access terminals, wherein the access terminals in the second group are those that are more than the threshold distance from the femtocell, the first and second ranges being mutually exclusive;
repeatedly transmitting (1) a first reverse activity bit (RAB) to the access terminals in the first group and (2) a second RAB to the access terminals in the second group;
measuring reverse noise rise (RNR) on a femtocell carrier, and comparing the measured RNR with a first RNR threshold; and
determining that the measured RNR is greater than the first RNR threshold, and responsively (1) clearing the first RAB and (2) setting the second RAB.

25. A method comprising:
a femtocell maintaining (1) a plurality of mutually exclusive ranges of MAC IDs and (2) a plurality of mutually exclusive ranges of distance from the femtocell, wherein each range of MAC IDs is associated with a respective range of distance from the femtocell;
the femtocell assigning MAC IDs to access terminals, wherein the femtocell selects MAC IDs for assignment to access terminals from the ranges of MAC IDs according to the respective distance of the access terminals from the femtocell;
the femtocell repeatedly transmitting a respective reverse activity bit (RAB) for each respective range of MAC IDs;
the femtocell measuring reverse noise rise (RNR) on a femtocell carrier, and comparing the measured RNR with an RNR threshold; and
the femtocell determining that the measured RNR is greater than the RNR threshold, and responsively (1) clearing the RAB for the range of MAC IDs for an innermost range of distance from the femtocell and (2) iteratively setting the RABs starting with the RAB for the range of MAC IDs for an outermost range of distance from the femtocell and proceeding inwards towards the femtocell, in each iteration checking the measured RNR against the RNR threshold, until the measured RNR is less than the RNR threshold.

* * * * *